(12) United States Patent
Choi et al.

(10) Patent No.: US 12,715,351 B2
(45) Date of Patent: Aug. 25, 2026

(54) ADJUSTABLE LATERAL-SUPPORT HEADREST FOR A VEHICLE SEAT

(71) Applicant: GM GLOBAL TECHNOLOGY OPERATIONS LLC, Detroit, MI (US)

(72) Inventors: Leeyong Choi, Gwangmyeong-si (KR); Seungil Lim, Seoul (KR); Soyeon Kim, Incheon (KR)

(73) Assignee: GM Global Technology Operations LLC, Detroit, MI (US)

( * ) Notice: Subject to any disclaimer, the term of this patent is extended or adjusted under 35 U.S.C. 154(b) by 142 days.

(21) Appl. No.: 18/756,492

(22) Filed: Jun. 27, 2024

(65) Prior Publication Data

US 2026/0001467 A1 Jan. 1, 2026

(51) Int. Cl.
*B60N 2/806* (2018.01)
*B60N 2/68* (2006.01)

(52) U.S. Cl.
CPC ............... *B60N 2/806* (2018.02); *B60N 2/68* (2013.01)

(58) Field of Classification Search
CPC .......... B60N 2/868; A61G 15/125; A47C 7/38
USPC .................................................. 297/391, 406
See application file for complete search history.

(56) References Cited

U.S. PATENT DOCUMENTS 544,106 A * 8/1895 Mann .................... B60N 2/885 297/407
3,547,486 A * 12/1970 Herzer .................... A47C 7/38 297/410
6,120,099 A * 9/2000 Reikerås et al. ....... B60N 2/868 297/391
6,513,871 B2 * 2/2003 Bartels .................. B60N 2/885 297/216.12
8,911,020 B2 * 12/2014 Westerink ............. B60N 2/885 297/406
9,028,000 B2 * 5/2015 Millan ..................... B60N 2/24 297/391
9,085,254 B2 * 7/2015 Navarro ................. B60N 2/885
11,660,992 B2 * 5/2023 Angelo .................. B60N 2/885 297/391
12,162,390 B2 * 12/2024 Yu ......................... B60N 2/853
(Continued)

FOREIGN PATENT DOCUMENTS

CN 113928198 B * 3/2023
CN 110920493 B * 5/2024 ............ B60N 2/806
(Continued)

*Primary Examiner* — Jose V Chen
(74) *Attorney, Agent, or Firm* — Quinn IP Law

(57) ABSTRACT

An adjustable side-support head restraint assembly for mounting to a vehicle seat having a seat cushion and backrest. The head restraint assembly is configured to limit rearward movement of a seat occupant's head relative to the seat occupant's torso and includes a center section configured to be mounted to the backrest. The head restraint assembly also includes a first wing rotatably mounted to the center section and provided to adjust an angle of the first wing between an unfolded position and a folded position relative to the center section and support the seat occupant's head in a first lateral direction. The head restraint assembly additionally includes a second wing rotatably mounted to the center section and provided to adjust an angle of the second wing between an unfolded position and a folded position relative to the center section and support the seat occupant's head in a second lateral direction.

12 Claims, 5 Drawing Sheets

(56) References Cited

U.S. PATENT DOCUMENTS

| | | | | |
|---|---|---|---|---|
| 12,508,965 | B2 * | 12/2025 | Yu | B60N 2/829 |
| 2003/0030309 | A1 * | 2/2003 | Pal | B60N 2/865<br>297/216.12 |
| 2004/0000807 | A1 * | 1/2004 | Pal | B60N 2/865<br>297/391 |
| 2004/0217639 | A1 * | 11/2004 | Clough | A47C 7/38<br>297/391 |
| 2007/0108827 | A1 * | 5/2007 | Clough | B60N 2/885<br>297/391 |
| 2008/0185894 | A1 * | 8/2008 | Yetukuri | B60N 2/885<br>297/406 |
| 2010/0179728 | A1 * | 7/2010 | Yetukuri | B60N 2/3002<br>701/45 |
| 2017/0224117 | A1 * | 8/2017 | DuFresne | A61G 5/121 |
| 2017/0349072 | A1 * | 12/2017 | Dillinger | B60N 2/2851 |
| 2018/0029876 | A1 * | 2/2018 | Fujita | A47C 7/38 |
| 2021/0061473 | A1 * | 3/2021 | Mansouri | B60N 2/885 |
| 2023/0202369 | A1 * | 6/2023 | Kim | B60N 2/885<br>297/391 |
| 2024/0075861 | A1 * | 3/2024 | Xiao | B60N 2/02253 |
| 2025/0065790 | A1 * | 2/2025 | Yu | B60N 2/865 |
| 2025/0353418 | A1 * | 11/2025 | Tezuka | B60N 2/879 |

FOREIGN PATENT DOCUMENTS

| | | | | |
|---|---|---|---|---|
| DE | 10302778 | A1 | | 8/2003 |
| DE | 102016116905 | A1 | | 3/2017 |
| JP | 09037889 | A | * | 2/1997 |

* cited by examiner 34A
52, 54
38, 44
63
62
60
56
56-1
58
64
68-1, 68-2
70-1, 70-2

52, 54

34A
63
56
56-1
60
58-1
62
68-1, 68-2
58
58-2

ADJUSTABLE LATERAL-SUPPORT HEADREST FOR A VEHICLE SEAT

INTRODUCTION

The present disclosure relates to a headrest with adjustable lateral-supports for a vehicle seat.

Head restraints (also called headrests) are frequently used in automotive seat assemblies. A vehicle seat head restraint may be designed to provide comfort and support for the vehicle seat occupant. Head restraints are typically attached or integrated into tops of seat backs to limit the rearward movement of the vehicle occupant's head relative to the torso, such as during sharp and/or sudden changes in vehicle speed. Head restraints may support the vehicle occupant's head in the event of forceful forward acceleration, to prevent or mitigate whiplash (hyperextension of the neck).

Head restraints may be integrated or fixed to the seatback. A fixed or integrated head restraint is formed by the upper part of the seat back or attached there. Such a head restraint is not height adjustable and is not easily detachable from the seatback. Head restraints may be adjustable. In such designs, head restraints are capable of being positioned to fit the morphology of the seated occupant. An adjustable head restraint may permit horizontal displacement, known as tilt adjustment, and/or vertical displacement, known as height adjustment.

Head restraints may also be active. In such designs, the head restraint is designed to change the restraint orientation and improve positioning of the occupant's head in response to sharp and/or sudden changes in vehicle speed. Additionally, head restraints may be automatically adjustable. In such designs, the head restraint orientation is preprogrammed to the seat position and is adjusted automatically when the seat position is altered to accommodate a passenger.

SUMMARY

An adjustable side-support head restraint assembly for mounting to a vehicle seat having a seat cushion and backrest. The head restraint assembly is configured to limit rearward movement of a vehicle seat occupant's head relative to the vehicle seat occupant's torso and includes a center section configured to be mounted to the backrest. The head restraint assembly also includes a first wing rotatably mounted to the center section and thereby provided to adjust an angle of the first wing between an unfolded position and a folded position relative to the center section and support the vehicle seat occupant's head in a first lateral direction. The head restraint assembly additionally includes a second wing rotatably mounted to the center section and thereby provided to adjust an angle of the second wing between an unfolded position and a folded position relative to the center section and support the vehicle seat occupant's head in a second lateral direction.

The first wing and the second wing may rotate synchronously relative to the center section.

The head restraint assembly may additionally include a first ratcheting mechanism configured to selectively latch the first wing in distinct positions relative to the center section and a second ratcheting mechanism configured to selectively lock the second wing in distinct positions relative to the center section.

The head restraint assembly additionally may also include a head restraint frame and each of the first and second ratcheting mechanisms may be mounted to the head restraint frame.

Each of the first and second ratcheting mechanisms may include a respective gear mounted to the head restraint frame and a latch configured to engage the corresponding gear to selectively lock the corresponding first or second wing relative to the center section.

Each of the first and second ratcheting mechanisms may additionally include a respective latching spring configured to preload the corresponding latch into engagement with the corresponding gear.

Each latch may be defined by a first and a second end and may include a latching pin. In such an embodiment, the latching pin may be arranged proximate the first end of the latch and the corresponding latching spring may be arranged proximate the second end of the latch.

Each respective gear may include asymmetrical teeth configured to catch or trap the corresponding latching pin.

Each of the first and second ratcheting mechanisms may additionally include a respective return spring configured to urge the corresponding first wing and second wing into the unfolded position.

The head restraint assembly may also include a first mass arranged integral with the first wing and configured to generate an inertial force to rotate the first wing into an extreme folded position when acted upon by a predetermined deceleration of the vehicle seat. Similarly, the head restraint assembly may additionally include a second mass arranged integral with the second wing and configured to generate an inertial force to rotate the second wing into an extreme folded position when acted upon by the predetermined deceleration of the vehicle seat.

The head restraint assembly may additionally include a first travel limiter mounted to the head restraint frame and, in its extreme folded position, configured to overcome the corresponding latching spring, dislodge the latch of the first ratcheting mechanism from engagement with the corresponding gear, and permit the corresponding return spring to shift the corresponding first wing into the respective unfolded position. Similarly, the head restraint assembly may include a second travel limiter mounted to the head restraint frame and configured to, in its extreme folded position, overcome the corresponding latching spring, dislodge the latch of the second ratcheting mechanism from engagement with the corresponding gear, and permit the corresponding return spring to shift the corresponding second wing into the respective unfolded position.

A vehicle seat assembly having the disclosed adjustable side-support head restraint assembly is also provided.

The above features and advantages, and other features and advantages of the present disclosure, will be readily apparent from the following detailed description of the embodiment (s) and best mode(s) for carrying out the described disclosure when taken in connection with the accompanying drawings and appended claims.

DETAILED DESCRIPTION

Figure 1:
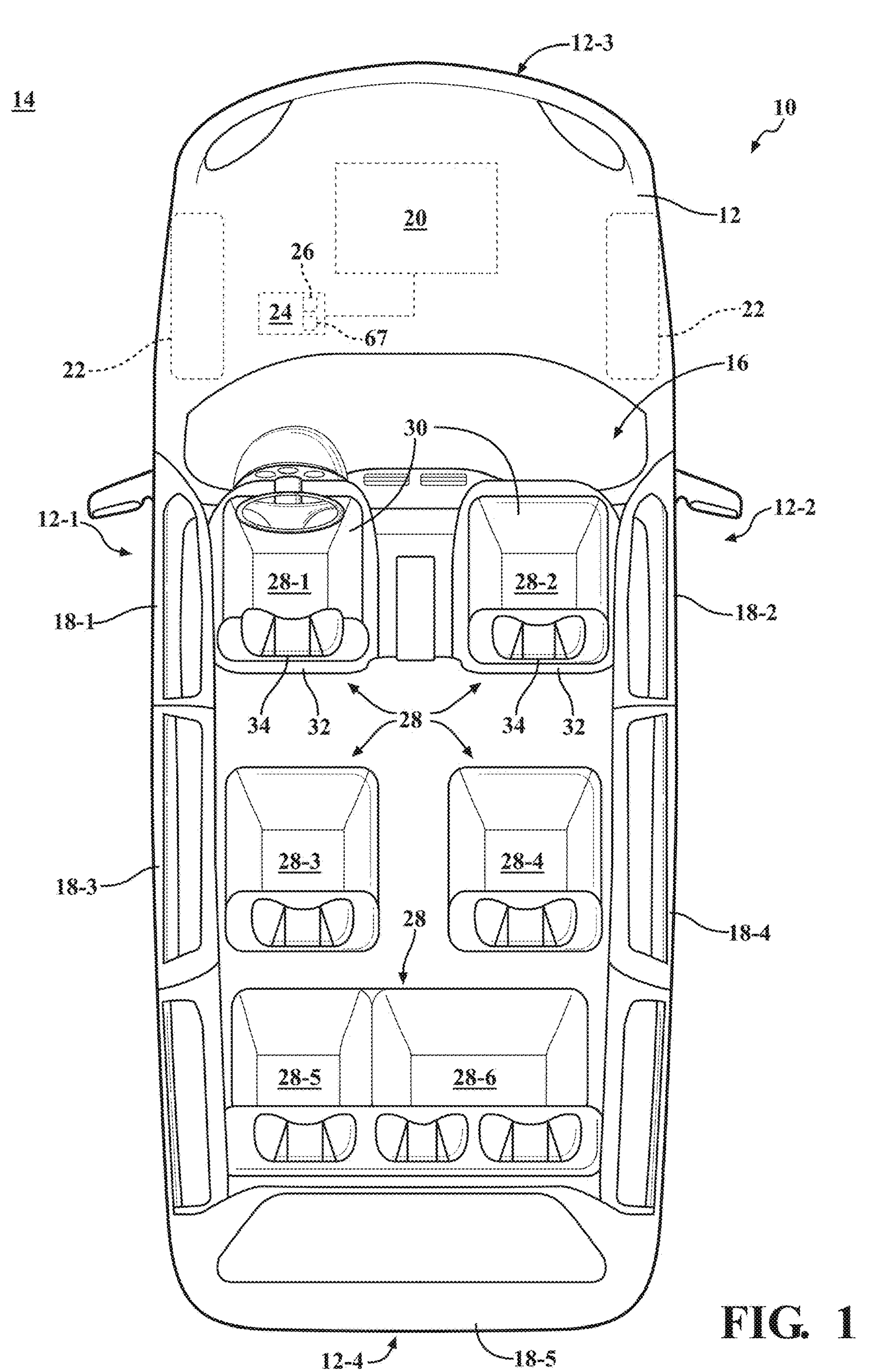
FIG. 1 is a schematic top view of a representative vehicle having a vehicle cabin with seat assemblies for vehicle occupants and illustrating the seat assemblies with adjustable side-support head restraint assemblies, according to the present disclosure.

Embodiments of the present disclosure as described herein are intended to serve as examples. Other embodiments may take various and alternative forms. Additionally, the drawings are generally schematic and not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

Certain terminology may be used in the following description for the purpose of reference only, and thus are not intended to be limiting. For example, terms such as "above" and "below" refer to directions in the drawings to which reference is made. Terms such as "front", "back", "fore", "aft", "left", "right", "rear", "side", "upward", "downward", "top", and "bottom", etc., describe the orientation and/or location of portions of the components or elements within a consistent but arbitrary frame of reference, which is made clear by reference to the text and the associated drawings describing the components or elements under discussion.

Furthermore, terms such as "first", "second", "third", and so on may be used to describe separate components. Such terminology may include the words specifically mentioned above, derivatives thereof, and words of similar import, and are used descriptively for the figures, and do not represent limitations on the scope of the disclosure, as defined by the appended claims. Moreover, the teachings may be described herein in terms of functional and/or logical block components and/or various processing steps. It should be realized that such block components may include a number of hardware, software, and/or firmware components configured to perform the specified functions.

Referring to the drawings, wherein like reference numbers refer to like components throughout the several views, FIG. 1 schematically depicts a vehicle 10. The vehicle 10 is generally characterized by a vehicle body 12 surrounded by an external environment 14. The vehicle body 12 defines a vehicle interior or cabin 16 configured to accommodate a vehicle operator and passenger(s), for example in a generally seated position. The vehicle body 12 includes a left-side section 12-1, a right-side section 12-2, a front-end section 12-3, and a rear-end section 12-4. The vehicle body 12 may also include a plurality of side doors, such as left-front door 18-1, right-front door 18-2, left-rear door 18-3, and right-rear door 18-4, and a tailgate 18-5 (at the rear-end section 12-4) for gaining access to the vehicle cabin 16.

The vehicle 10 also includes a powerplant 20 configured to generate an output torque for powering the vehicle. The powerplant 20 may include an internal combustion engine, electric motor(s), and/or a fuel cell configured to propel the vehicle, such as via driven wheels 22. The vehicle 10 also includes an electronic controller 24 (shown in FIGS. 1 and 2). The electronic controller 24 may be a central processing unit (CPU) or a body control module (BCM) configured to receive data signals from various vehicle sensors and regulate operation of vehicle systems. The electronic controller 24 may be in operative communication with such vehicle systems and sensors via a data network, e.g., a Controller Area Network (CAN bus), arranged in the vehicle 10.

The electronic controller 24 includes a memory that is tangible and non-transitory. The memory may be a recordable medium that participates in providing computer-readable data or process instructions. Such a medium may take many forms, including but not limited to non-volatile media and volatile media. Non-volatile media used by the electronic controller 24 may include, for example, optical or magnetic disks and other persistent memory. Volatile media of each of the controller's memory may include, for example, dynamic random-access memory (DRAM), which may constitute a main memory. Such instructions may be transmitted by one or more transmission medium, including coaxial cables, copper wire and fiber optics, including the wires that comprise a system bus coupled to the vehicle systems. Memory of the electronic controller 24 may also include a flexible disk, hard disk, magnetic tape, other magnetic medium, a CD-ROM, DVD, other optical medium, etc. The electronic controller 24 may be equipped with a high-speed primary clock, requisite Analog-to-Digital (A/D) and/or Digital-to-Analog (D/A) circuitry, input/output circuitry and devices (I/O), as well as appropriate signal conditioning and/or buffer circuitry. Algorithms required by the electronic controller 24 or accessible thereby, generally indicated via numeral 26, may be stored in the memory and automatically executed to provide the required functionality.

Figure 2:
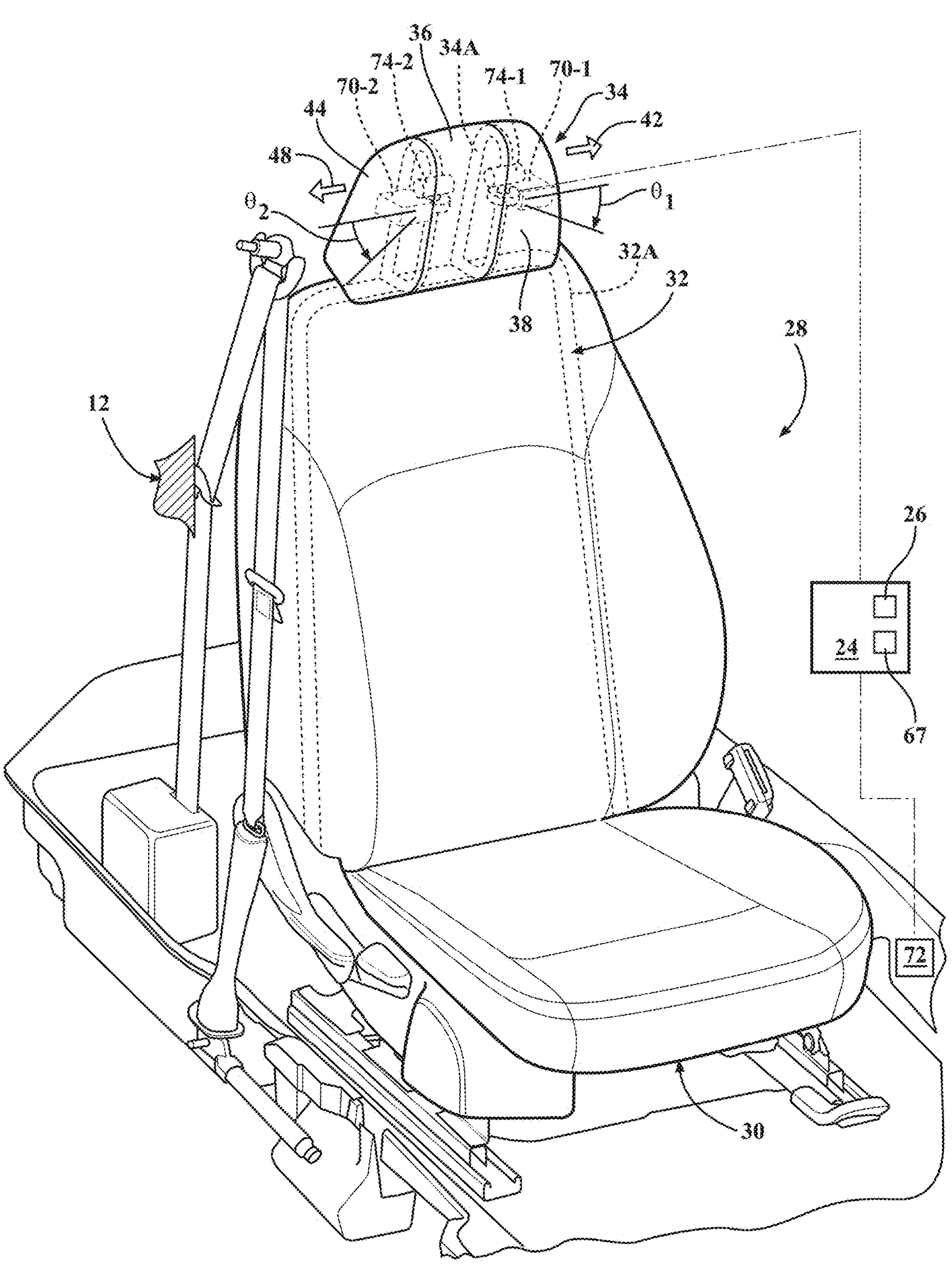
FIG. 2 is a schematic close-up perspective view of a representative seat assembly with the adjustable side-support head restraint assembly shown in FIG. 1, illustrating first and second wings rotatably mounted to a center section, specifically depicting the first and second wings in an unfolded position, according to the present disclosure.

As further shown in FIG. 1, the vehicle 10 may also include one or more vehicle seats or seat assemblies 28, such as a front left-side seat 28-1, a front right-side seat 28-2, rear left-side seat 28-3, and a rear right-side seat 28-4 arranged inside the cabin 16. The vehicle 10 may additionally include seat assemblies 28 in additional rows for carrying more passengers (such as seats 28-5 and 28-6), as shown. Such seat assemblies 28 may recline and/or be positionally adjustable relative to the vehicle body 12 for use by respective vehicle's occupants, such as the driver or passenger. As shown, each seat assembly 28 includes a seat cushion 30, a backrest 32, and an adjustable side-support head restraint assembly 34. As shown in FIG. 2, the backrest 32 has a backrest frame 32A providing structure therefor. The adjustable side-support head restraint assembly 34 is mounted to the backrest 32 and configured to limit rearward movement of a vehicle seat occupant's head relative to the vehicle seat occupant's torso.

With continued reference to FIG. 2, the head restraint assembly 34 includes a head restraint frame 34A supporting a center section 36 constructed from yielding material, such as foam, for contact with the occupant's head. As shown, the center section 36 may be mounted to the backrest frame 32A via the head restraint frame 34A. The head restraint assembly 34 includes a first side section or wing 38 rotatably mounted to the center section 36. The first wing 38 is thereby provided to adjust its angle $\theta_1$ relative to the center section

Figure 6:
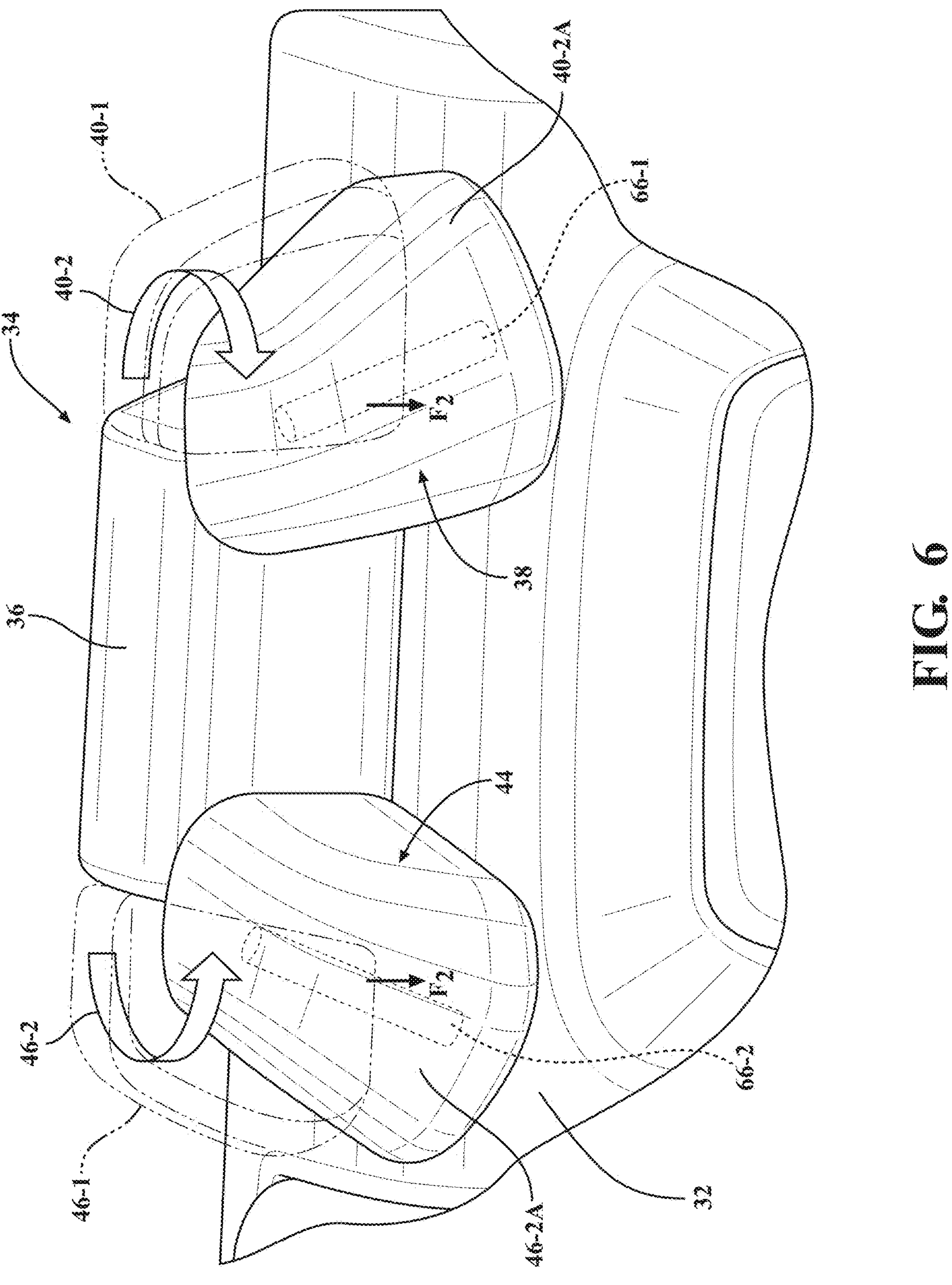
FIG. 6 is a schematic close-up perspective view of the adjustable side-support head restraint assembly shown in FIG. 2, illustrating an extreme folded position of each rotatable headrest wing.

36 and vary between an unfolded or flat position 40-1 and a folded or angled position 40-2 (shown in FIG. 6) to support the vehicle seat occupant's head in a first lateral direction 42. The head restraint assembly 34 also includes a second wing 44 rotatably mounted to the center section 36 and thereby provided to adjust its angle $\theta_2$ relative to the center section. Each wing 38, 44 may include a bearing 45 for mounting the respective wing to the center section 36. As a result of changing the angle $\theta_2$, the second wing 44 is configured to vary between an unfolded position 46-1 and a folded position 46-2 (shown in FIG. 6) to support the vehicle seat occupant's head in a second lateral direction 48.

Figure 3:
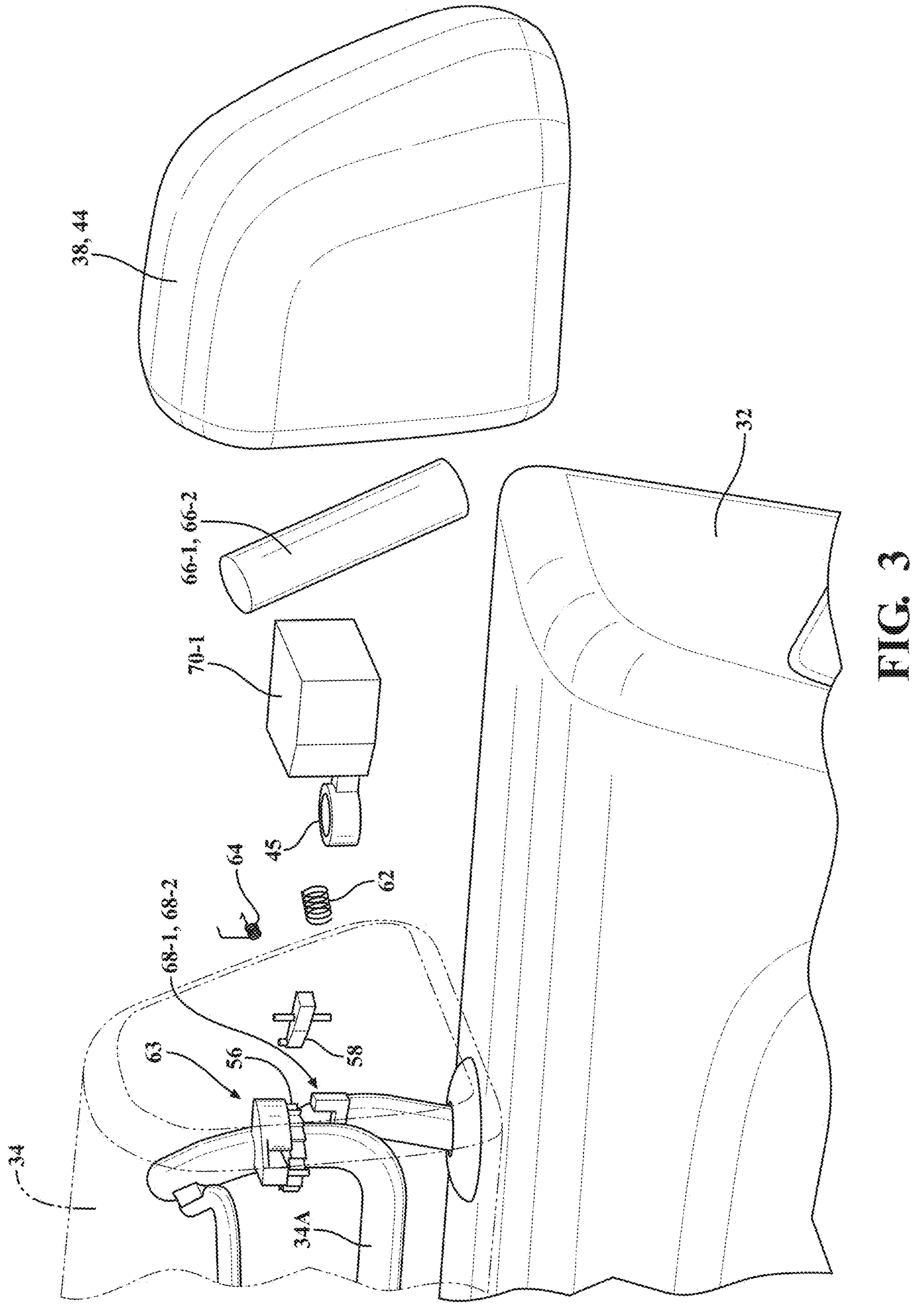
FIG. 3 is a schematic close-up exploded perspective view of the adjustable side-support head restraint assembly shown in FIG. 2, according to the present disclosure.
Figure 4:
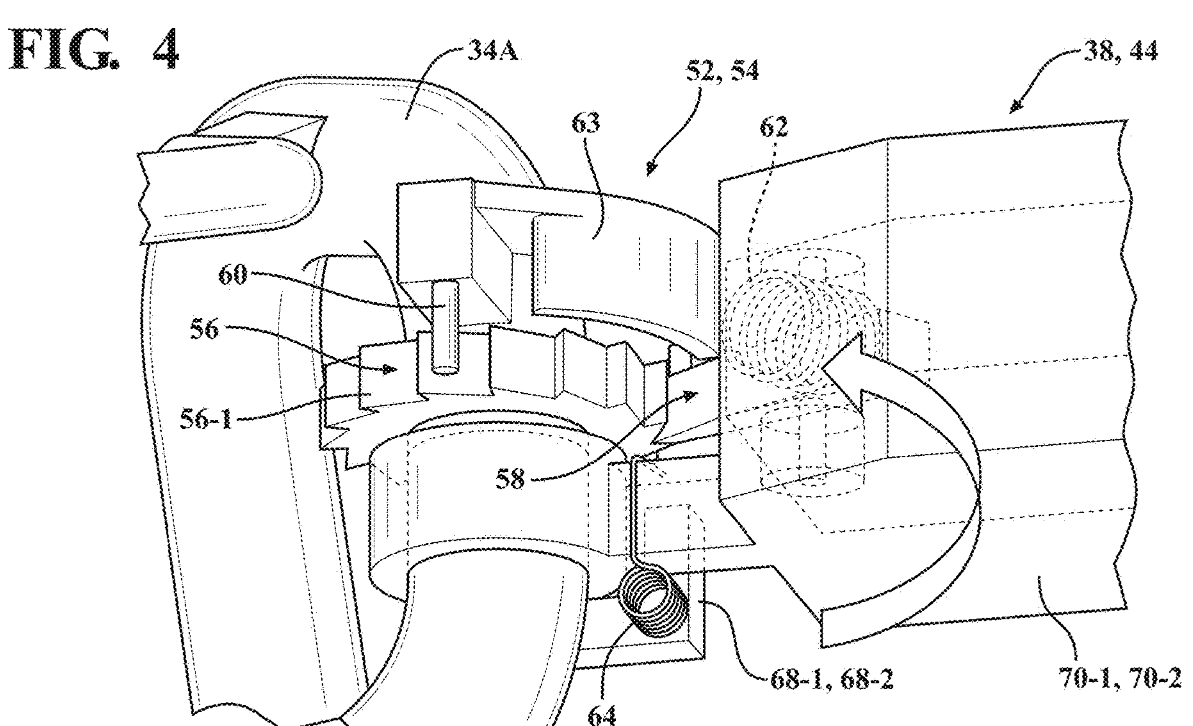
FIG. 4 is a schematic close-up first perspective view of the adjustable side-support head restraint assembly shown in FIG. 2, illustrating a ratcheting mechanism of each of the first and second rotatable wings, according to the present disclosure.
Figure 5:
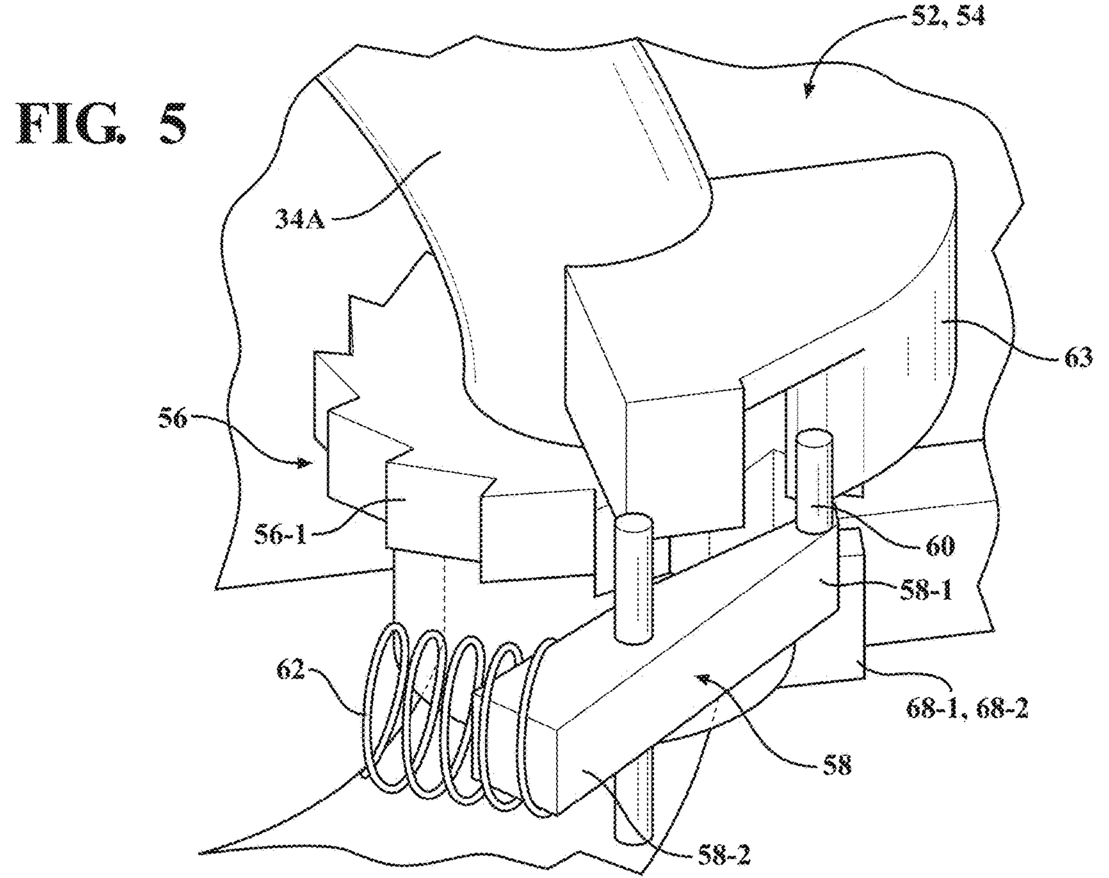
FIG. 5 is a schematic close-up second perspective view of the adjustable side-support head restraint assembly shown in FIG. 2, illustrating the representative ratcheting mechanism of each of the first and second rotatable wings, according to the present disclosure.

The adjustable first and second wings 38, 44 also permit the seat occupant's head to be supported during sharp and/or sudden changes in vehicle direction. Each wing 38, 44 may be constructed from yielding or soft material and include a respective wing frame serving as the corresponding wing's rigid structure. The first wing 38 and the second wing 44 may be configured to rotate synchronously and thus adjust their respective angles $\theta_1$, $\theta_2$ simultaneously and symmetrically relative to the center section 36. As shown in FIGS. 3-5, the head restraint assembly 34 may additionally include a first ratcheting mechanism 52 and a second ratcheting mechanism 54. The first ratcheting mechanism 52 is configured to selectively latch the first wing 38 in distinct positions relative to the center section 36, Similarly, the second ratcheting mechanism 54 is configured to selectively latch the second wing 44 in distinct positions relative to the center section 36. As shown, each of the first and second ratcheting mechanisms 52, 54 may be mounted to the head restraint frame 34A.

As shown, each of the first and second ratcheting mechanisms 52, 54 may include a respective gear 56 mounted to the head restraint frame 34A. Each of the first and second ratcheting mechanisms 52, 54 may also include a moveable, e.g., hinged, latch 58. The latch 58 includes a latching pin 60 configured to engage the corresponding gear 56 to selectively lock the corresponding first wing 38 or second wing 44 relative to the center section 36. Each of the first and second ratcheting mechanisms 52, 54 may additionally include a respective latching spring 62 configured to preload the latching pin 60 into the corresponding gear 56. Each latch 58 is defined by a first end 58-1 and a second end 58-2. Each latching pin 60 may be arranged proximate the first end 58-1 and each latching spring 62 may be arranged proximate the second end 58-2 of the corresponding latch 58. As shown, each of the ratcheting mechanisms 52, 54 may additionally include a respective latch guide 63 configured to direct the path of latch 58 relative to the corresponding gear 56 and thereby facilitate the engagement of the latching pin 58 with the subject gear.

With continued reference to FIGS. 3-5, each respective gear 56 may be fixed to the head restraint frame 34A. Furthermore, each respective gear 56 may include asymmetrical teeth 56-1 (shown in FIGS. 4-5). The asymmetrical teeth 56-1 are angled or ramped permitting the latching pin 60 to slide from one tooth to the next thereby facilitating a ratcheting adjustment of the corresponding first and second wings 38, 44 toward a more folded or angled position. With the latch 58 being urged by the action of the latching spring 62, the asymmetrical teeth 56-1 are also configured to catch or trap the corresponding latching pin 60 in selected position, thereby blocking the return of the corresponding first and second wings 38, 44 to their previous, less folded position. Such action of the asymmetrical teeth 56-1 permits incremental adjustment of the first and second wings 38, 44 relative to the center section 36 to select desired support for the vehicle seat occupant's head in the respective first and second lateral directions 42, 48.

Each of the first and second ratcheting mechanisms 52, 54 may additionally include a respective return spring 64 (shown in FIGS. 3-4). The respective return springs 64 are configured to urge the respective first wing 38 and second wing 44 into the corresponding unfolded or flat position 40-1, 46-1. With particular reference to FIGS. 2-3, the head restraint assembly 34 may also include a first mass 66-1 arranged integral with the first wing 38. The first mass 66-1 is configured to generate a first inertial force $F_1$ to rotate the first wing 38 into a corresponding extreme folded position 40-2A when acted upon by a predetermined deceleration 67 of the vehicle seat assembly 28, such as during hard vehicle braking or forceful contact. Similarly, as also shown in FIGS. 2-3, the head restraint assembly 34 may include a second mass 66-2 arranged integral with the second wing 44. The second mass 66-2 is configured to generate a second inertial force $F_2$ to rotate the second wing 44 into the corresponding extreme folded position 46-2A when subjected to the predetermined deceleration 67 of the vehicle seat assembly 28.

The head restraint assembly 34 may additionally include a first travel limiter or stopper 68-1 mounted to the head restraint frame 34A (shown in FIGS. 3-5). In the extreme folded position 40-2A, the first travel limiter 68-1 is configured to overcome the corresponding latching spring 62 and dislodge the latching pin 60 of the first ratcheting mechanism 52 from engagement with the corresponding gear 56 by shifting the corresponding latch 58. The first travel limiter 68-1 thus permits the corresponding return spring 64 to shift or return the first wing 38 into the respective unfolded position 40-1. The head restraint assembly 34 may further include a second travel limiter 68-2 mounted to the head restraint frame 34A. In the extreme folded position 46-2A, the second travel limiter 68-2 is configured to overcome the corresponding latching spring 62 and dislodge the latching pin 60 of the second ratcheting mechanism 54 from engagement with the corresponding gear 56 by shifting its latch 58. Accordingly, the second travel limiter 68-2 permits the corresponding return spring 64 to shift the second wing 44 into the respective unfolded position 46-1. Each latch 58 and the corresponding latching spring 62 may be mounted inside a respective housing 70-1, 70-2 itself arranged inside the respective first or second wing 38, 44.

The head restraint assembly 34 may additionally include sections of material (not shown) covering the backside of the headrest and specifically the regions of interface between the center section 36 and the first and second wings 38, 44. The material covering the subject interface regions would shield the ratcheting mechanisms 52, 54 from debris and casual access by a vehicle occupant. Such material may be a fabric also used on the portions of the head restraint assembly 34 configured to contact the head of the seat occupant. Furthermore, the material may be flexible and/or stretchable to permit the first wing 38 and the second wing 44 to negotiate their respective ranges of adjustment relative to the center section 36 without being caught between moving components of the ratcheting mechanisms 52, 54.

With resumed reference to FIG. 2, the electronic controller 24 may be operatively connected to a vehicle sensor 72 and to the seat assemblies 28-1, 28-2, 28-3, 28-4 and programmed to operate the head restraint assembly 34. The vehicle sensor 72 may be configured to detect longitudinal acceleration of the vehicle seat assembly 28 and communicate the detected acceleration to the electronic controller 24.

The head restraint assembly 34 may additionally include respective first and second actuators, e.g., solenoids, 74-1, 74-2 mounted to the head restraint frame 34A. Each of the first and second actuators 74-1, 74-2 is configured to act on the corresponding latch 58 when commanded by the electronic controller 24. In response to detection of the predetermined deceleration 67 of the vehicle seat assembly 28 via the vehicle sensor 72, the electronic controller 24 may command the first and second actuators 74-1, 74-2 to synchronously shift the latches 58 of the first and second ratcheting mechanisms 52, 54.

As a result of the latches 58 being shifted by the respective first and second actuators 74-1, 74-2, the latching pins 60 will be withdrawn from contact with the respective gears 56. The withdrawal of the latching pins 60 from engagement with the respective gears 56 in turn permits the release and synchronous return of corresponding first and second wings 38, 44 to their flat positions 40-1, 46-1 under hard deceleration of the vehicle 10. Such controller 24 commanded operation of the head restraint assembly 34 may be implemented as an alternative to or along with the use of first and second masses 66-1, 66-2. Overall, the adjustable side-support head restraint assembly 34 provides a vehicle seat assembly with selectable support the vehicle seat occupant's head in lateral directions and automatic return of the side-supports to their original, flat position under hard deceleration of the vehicle.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings, or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. An adjustable side-support head restraint assembly for mounting to a vehicle seat having a seat cushion and backrest and configured to limit rearward movement of a head relative to a torso of a vehicle seat occupant, the head restraint assembly comprising:
- a center section configured to be mounted to the backrest;
- a first wing rotatably mounted to the center section and thereby provided to adjust an angle of the first wing between an unfolded position and a folded position relative to the center section and support the vehicle seat occupant's head in a first lateral direction;
- a second wing rotatably mounted to the center section and thereby provided to adjust an angle of the second wing between an unfolded position and a folded position relative to the center section and support the vehicle seat occupant's head in a second lateral direction;
- a first ratcheting mechanism configured to selectively lock the first wing in distinct positions relative to the center section;
- a second ratcheting mechanism configured to selectively lock the second wing in distinct positions relative to the center section; and
- a head restraint frame;

wherein each of the first and second ratcheting mechanisms is mounted to the head restraint frame and each of the first and second ratcheting mechanisms includes:
- a respective gear mounted to the head restraint frame;
- a latch configured to engage the corresponding gear to selectively lock the corresponding first or second wing relative to the center section; and
- a respective latching spring configured to preload the corresponding latch into engagement with the corresponding gear.

2. The adjustable side-support head restraint assembly of claim 1, wherein the first wing and the second wing rotate synchronously relative to the center section.

3. The adjustable side-support head restraint assembly of claim 1, wherein each latch is defined by a first and a second end and includes a latching pin, and wherein the latching pin is arranged proximate the first end of the latch and the corresponding latching spring is arranged proximate the second end of the latch.

4. The adjustable side-support head restraint assembly of claim 3, wherein each respective gear includes asymmetrical teeth configured to catch the corresponding latching pin.

5. The adjustable side-support head restraint assembly of claim 3, wherein each of the first and second ratcheting mechanisms additionally includes a respective return spring configured to urge the corresponding first wing and second wing into the unfolded position.

6. The adjustable side-support head restraint assembly of claim 5, further comprising:
- a first mass arranged integral with the first wing and configured to generate an inertial force to rotate the first wing into an extreme folded position when acted upon by a predetermined deceleration of the vehicle seat;
- a second mass arranged integral with the second wing and configured to generate an inertial force to rotate the second wing into an extreme folded position when acted upon by the predetermined deceleration of the vehicle seat;
- a first travel limiter mounted to the head restraint frame and, in the extreme folded position, configured to overcome the corresponding latching spring, dislodge the latch of the first ratcheting mechanism from engagement with the corresponding gear, and permit the corresponding return spring to shift the corresponding first wing into the respective unfolded position; and
- a second travel limiter mounted to the head restraint frame and, in the extreme folded position, configured to overcome the corresponding latching spring, dislodge the latch of the second ratcheting mechanism from engagement with the corresponding gear, and permit the corresponding return spring to shift the corresponding second wing into the respective unfolded position.

7. A vehicle seat assembly comprising:
- a seat cushion;
- a backrest; and
- an adjustable side-support head restraint assembly mounted to the backrest and configured to limit rearward movement a head relative to a torso of a vehicle seat occupant;

wherein the head restraint assembly includes:
- a center section mounted to the backrest;
- a first wing rotatably mounted to the center section and thereby provided to adjust an angle of the first wing between an unfolded position and a folded position relative to the center section and support the vehicle seat occupant's head in a first lateral direction; and a second wing rotatably mounted to the center section and thereby provided to adjust an angle of the second wing between an unfolded position and a folded position relative to the center section and support the vehicle seat occupant's head in a second lateral direction;

a first ratcheting mechanism configured to selectively lock the first wing in distinct positions relative to the center section;

a second ratcheting mechanism configured to selectively lock the second wing in distinct positions relative to the center section; and a head restraint frame;

wherein each of the first and second ratcheting mechanisms is mounted to the head restraint frame and each of the first and second ratcheting mechanisms includes:

a respective gear mounted to the head restraint frame;

a latch configured to engage the corresponding gear to selectively lock the corresponding first or second wing relative to the center section; and a respective latching spring configured to preload the corresponding latch into engagement with the corresponding gear.

8. The vehicle seat assembly of claim 7, wherein each latch is defined by a first and a second end and includes a latching pin, and wherein the latching pin is arranged proximate the first end of the latch and the corresponding latching spring is arranged proximate the second end of the latch.

9. The vehicle seat assembly of claim 8, wherein each respective gear includes asymmetrical teeth configured to catch the corresponding latching pin.

10. The vehicle seat assembly of claim 8, wherein each of the first and second ratcheting mechanisms additionally includes a respective return spring configured to urge the corresponding first wing and second wing into the unfolded position.

11. The vehicle seat assembly of claim 10, wherein the head restraint assembly additionally includes:

a first mass arranged integral with the first wing and configured to generate an inertial force to rotate the first wing into an extreme folded position when acted upon by a predetermined deceleration of the vehicle seat assembly;

a second mass arranged integral with the second wing and configured to generate an inertial force to rotate the second wing into an extreme folded position when acted upon by the predetermined deceleration of the vehicle seat assembly;

a first travel limiter mounted to the head restraint frame and, in the extreme folded position, configured to overcome the corresponding latching spring, dislodge the latch of the first ratcheting mechanism from engagement with the corresponding gear, and permit the corresponding return spring to shift the corresponding first wing into the respective unfolded position; and a second travel limiter mounted to the head restraint frame and, in the extreme folded position, configured to overcome the corresponding latching spring, dislodge the latch of the second ratcheting mechanism from engagement with the corresponding gear, and permit the corresponding return spring to shift the corresponding second wing into the respective unfolded position.

12. An adjustable side-support head restraint assembly for mounting to a vehicle seat having a seat cushion and backrest and configured to limit rearward movement of a head relative to a torso of a vehicle seat occupant, the head restraint assembly comprising:

a center section configured to be mounted to the backrest;

a first wing rotatably mounted to the center section and thereby provided to adjust an angle of the first wing between an unfolded position and a folded position relative to the center section and support the vehicle seat occupant's head in a first lateral direction;

a second wing rotatably mounted to the center section and thereby provided to adjust an angle of the second wing between an unfolded position and a folded position relative to the center section and support the vehicle seat occupant's head in a second lateral direction;

a first ratcheting mechanism configured to selectively lock the first wing in distinct positions relative to the center section; and a second ratcheting mechanism configured to selectively lock the second wing in distinct positions relative to the center section;

wherein the head restraint assembly additionally includes a head restraint frame, each of the first and second ratcheting mechanisms is mounted to the head restraint frame; and each of the first and second ratcheting mechanisms includes:

a respective gear mounted to the head restraint frame;

a latch configured to engage the corresponding gear to selectively lock the corresponding first or second wing relative to the center section; and a respective latching spring configured to preload the corresponding latch into engagement with the corresponding gear; and wherein each latch is defined by a first and a second end and includes a latching pin, and wherein the latching pin is arranged proximate the first end of the latch and the corresponding latching spring is arranged proximate the second end of the latch.

* * * * *